United States Patent [19]

White, Jr.

[11] Patent Number: 4,552,519

[45] Date of Patent: Nov. 12, 1985

[54] HYDROSTATIC STEERING UNIT WITH CYLINDRICAL SLIDE MEMBER WITHIN CYLINDRICAL VALVE SLEEVE

[76] Inventor: Hollis N. White, Jr., 243 Pyle La., Hopkinsville, Ky. 42240

[21] Appl. No.: 567,429

[22] Filed: Dec. 30, 1983

Related U.S. Application Data

[63] Continuation-in-part of Ser. No. 439,058, Nov. 4, 1982, Pat. No. 4,494,916, which is a continuation-in-part of Ser. No. 381,946, May 26, 1982, abandoned, which is a continuation-in-part of Ser. No. 317,501, Nov. 2, 1981, Pat. No. 4,494,915, which is a continuation-in-part of Ser. No. 51,508, Jun. 25, 1979, abandoned.

[51] Int. Cl.⁴ .................... F04C 2/10; F15B 13/04; B62D 5/08
[52] U.S. Cl. .................... 418/61 B; 29/156.4 R; 60/384; 403/4; 403/355; 403/DIG. 8
[58] Field of Search ............... 418/61 B; 60/384, 386; 91/375 R, 375 A; 137/625.69; 180/132; 403/4, 355, DIG. 8; 464/162, 182, 901; 29/156.4 R

[56] References Cited

U.S. PATENT DOCUMENTS

| | | | |
|---|---|---|---|
| 2,102,420 | 12/1937 | Kogstrom | 403/DIG. 7 |
| 3,286,645 | 11/1966 | Albers | 418/61 B |
| 3,348,493 | 10/1967 | Easton | 418/61 B |
| 3,385,057 | 5/1968 | Pruvot et al. | 418/61 B |
| 3,493,249 | 2/1970 | Conrad, Jr. et al. | 403/DIG. 8 |
| 3,598,509 | 8/1971 | Goff et al. | 418/61 B |

FOREIGN PATENT DOCUMENTS

| | | | |
|---|---|---|---|
| 1019515 | 11/1957 | Fed. Rep. of Germany | 464/162 |
| 2106171 | 9/1971 | Fed. Rep. of Germany | 464/182 |

Primary Examiner—John J. Vrablik
Attorney, Agent, or Firm—Woodling, Krost, Rust & Hochberg

[57] ABSTRACT

A hydrostatic steering unit is presented with axial spool valve actuation, and a gerotor set with valving in the rotor side face. The gerotor set comprises an orbiting gerotor displacement device with rotor valving, and with an input drive system directly to the gerotor device without driving through the valving, and also with an axially movable valve with a torsion member between the orbiting gerotor member and the input shaft. There is a split actuation pin for the valve, an eccentric bushing for the pin, and an adjustment for the neutral position of the valve.

11 Claims, 36 Drawing Figures

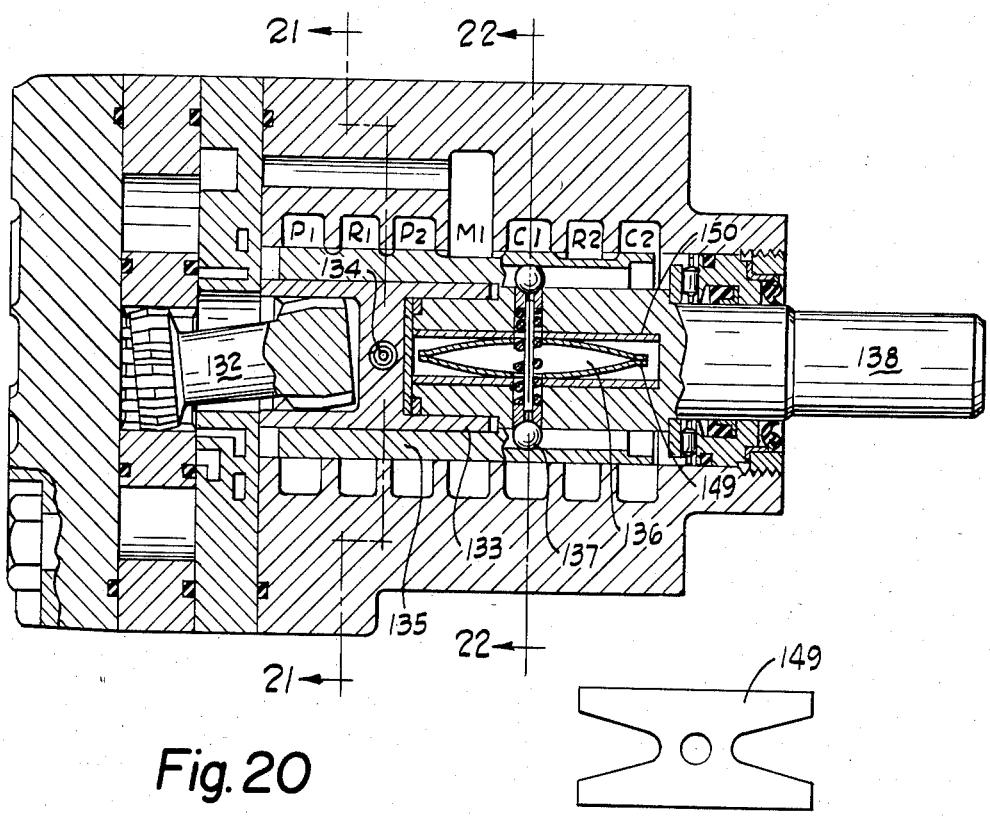
Fig. 20
Fig. 20A
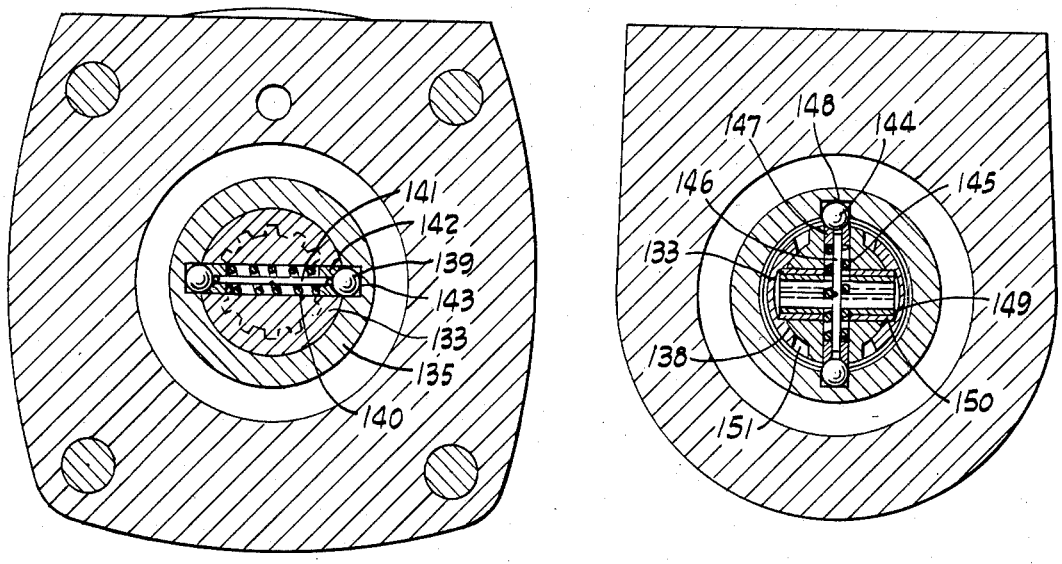
Fig. 21
Fig. 22

4,552,519

HYDROSTATIC STEERING UNIT WITH CYLINDRICAL SLIDE MEMBER WITHIN CYLINDRICAL VALVE SLEEVE

This present application is a Continuation-in-Part of Mr. White's prior Hydrostatic Steering Unit application, Ser. No. 439,058, filed Nov. 4, 1982, now U.S. Pat. No. 4,494,916, which application is a Continuation-in-Part of Ser. No. 381,946, field May 26, 1982, now abandoned, which application is a Continuation-in-Part of Ser. No. 317,501 filed Nov. 2, 1981, now U.S. Pat. No. 4,494,915, which in turn is a Continuation-in-Part of Ser. No. 51,508 filed June 25, 1979, now abandoned.

This invention relates to an improvement on U.S. Pat. No. 3,452,543 granted July 1, 1969, to Ramon L. Goff and Hollis N. White, Jr. This earlier patent had a direct drive connection between the input drive shaft and the spool valve. The present invention has a cylindrical slide member closely inside the spool valve, which slide member is rotatable relative to the spool valve and the input drive shaft is directly connected to the slide member.

It is an object of this invention to simplify the construction and operation of hydrostatic steering devices.

It is an object of this invention to reduce the number of moving parts in hydrostatic steering devices.

It is an object of this invention to strengthen the construction of hydrostatic steering devices.

It is an object of this invention to reduce and simplify the number of manufacturing operations to make hydrostatic steering devices.

It is an object of this invention to constantly vary the path of the hydraulic fluid in hydrostatic steering devices. This cools and lubricates the moving parts of the device.

It is an object of this invention to reduce the physical size of hydrostatic steering devices.

Other objects and advantages of the present invention will be apparent from the accompanying drawings and description and the essential features thereof will be set forth in the appended claims.

BRIEF DESCRIPTION OF THE DRAWINGS

FIGS. 5, 6, 7 and 8 are sectional views taken along similarly numbered lines of FIG. 3, while

FIG. 20 is a central sectional view like FIG. 1 of a third hydrostatic steering device.

FIG. 20A is a top view of the compression spring of FIG. 20.

FIG. 21 is a sectional view of the device of FIG. 20 taken generally along lines 21—21 of that figure.

FIG. 22 is a sectional view of the device of FIG. 20 taken generally along lines 22—22 of that figure.

DESCRIPTION OF PREFERRED EMBODIMENTS

Figure 1:
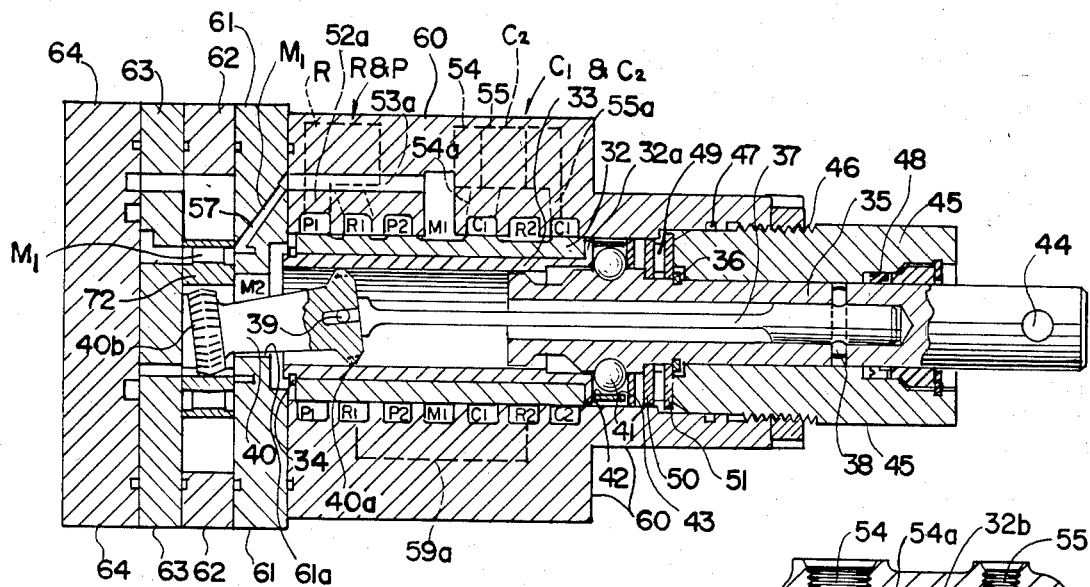
FIG. 1 is a central sectional view through the hydrostatic steering device taking along the line 1—1 of FIG. 2.

Referring now to FIG. 1, the hydrostatic steering device of this invention comprises a housing 60 to one end of which are fastened successively a wear plate 61, a gerotor set 62, a manifold 63 and an end cap 64. These parts are held together by bolts 65, shown in FIG. 2 which pass through all of the parts and hold them firmly assembled as shown in FIGS. 1 through 4.

The hydrostatic steering device comprises a generally cylindrical sleeve or spool valve 32 axially movable relative to a cylindrical bore in the center of the housing 60. Close fitting inside of the spool valve with a slight clearance, preferably between about 0.002 inches and 0.020 inches, is a slide member 33 which is rotatable inside of the sleeve spool valve 32. These two parts are arranged to move axially together which is accomplished by means of a radially outward projection 32a at one end of the sleeve valve and a snap ring 34 at the outer end of the slide member against which the sleeve valve abuts. Within the slide member is a drive shaft 35 which is oscillatably mounted in the housing 60 and secured against axial movement relative to the housing by a snap ring 36. Axially of the drive shaft 36, is a torsion bar 37 which is firmly fixed to the drive shaft by a pin 38 at one end, and at the other end it has a pivot connection 39 with a wobble stick 40 which has a spline connection at 40a with the slide member 33 and a spline connection at 40b with the rotor member 72 of the gerotor set 62. This torsion bar may be twisted a certain amount in a circumferential direction relative to the drive shaft 35 so that when the drive shaft is firmly held, the other end, connected with the wobble stick, will be permitted to oscillate a small amount as will later be described.

Figure 5:
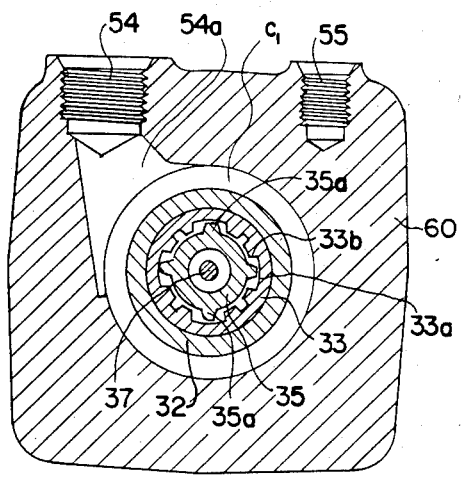

The connection between the drive shaft 35 and the slide member 33 is clearly seen in FIG. 5. On the drive shaft are a plurality of radially outwardly extending projections 35a, four such projections being shown spaced 90° apart, and these engage in recesses 33a in the slide member. These recesses are circumferentially of such an extent that they permit the movement of the projections 35a approximately 15° in each direction from the neutral position, shown in FIG. 5, after which oscillating movement, the projection 35a will strike one of the shoulders 33b at either end of a recess 33a.

Figure 3:
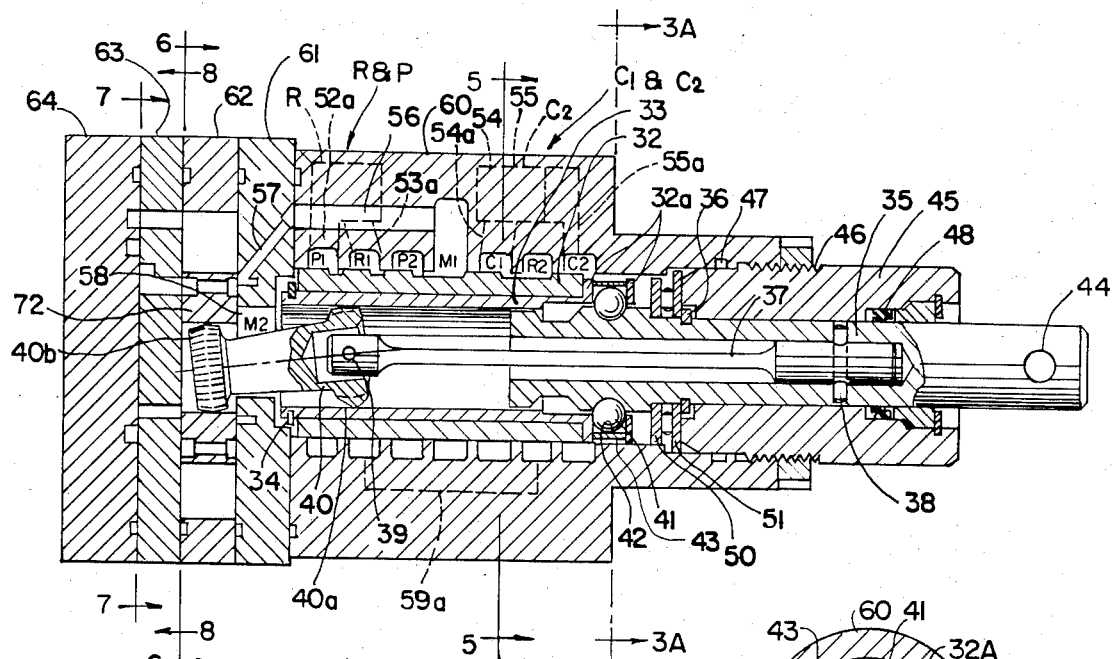
FIG. 3 is a view similar to FIG. 1 but showing the parts positioned to provide a right turn to the dirigible vehicle.
Figure 3A:
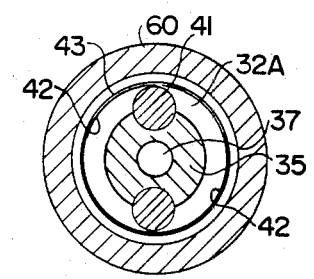
FIG. 3A is a sectional view along the line 3A—3A of FIG. 3.
Figure 4:
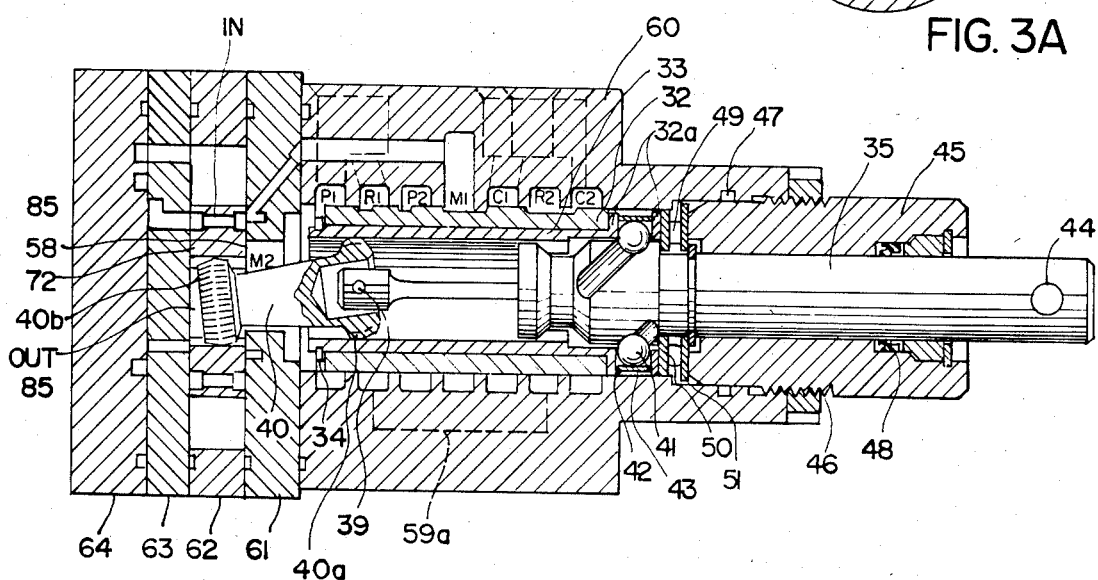
FIG. 4 is a view similar to FIG. 1 but showing the parts in position for a left turn of a dirigible vehicle.

Means is provided whereby oscillation of the drive shaft 35 will cause movement axially of the slide member 33 and the sleeve valve 32. This structure comprises a plurality of balls 41, carried in suitable recesses in the drive shaft 35 and the slide member 33, shown in FIG. 3A. These balls engage radially inwardly in short helical grooves 42 carried by the drive shaft 35. The balls are held against radial movement by the snap ring 43 on the outside and they engage against the projections 32a of the slide member in the horizontal direction. Thus, oscillation of the drive shaft 35 by a member attached at 44, will cause a small amount of axial movement of the sleeve valve 32 and the slide member 33 in either direction from the neutral position shown in FIG. 1. Such position is shown in FIG. 3 to cause a right turn of the dirigible vehicle. Such a position is shown in FIG. 4 to cause a left turn of the dirigible vehicle.

A sealing ring 45 is threaded into the housing 60 at 46 and fits closely between the housing and the drive shaft 35. A seal 47 is provided between the ring 45 and the housing 60 and another seal 48 is provided between the shaft 35 and the ring 45.

Thrust bearings 49 are provided between rings 50 and 51 to absorb any thrust toward the right as seen in FIG. 3.

A plurality of recesses are provided in the housing 60 in a row parallel to the axis of the drive shaft 35 and close to and opening toward the sleeve valve 32. These recesses are designated from left to right in FIGS. 1, 3 and 4 consecutively as P1, R1, P2, M1, C1, R2 and C2.

Figure 2:
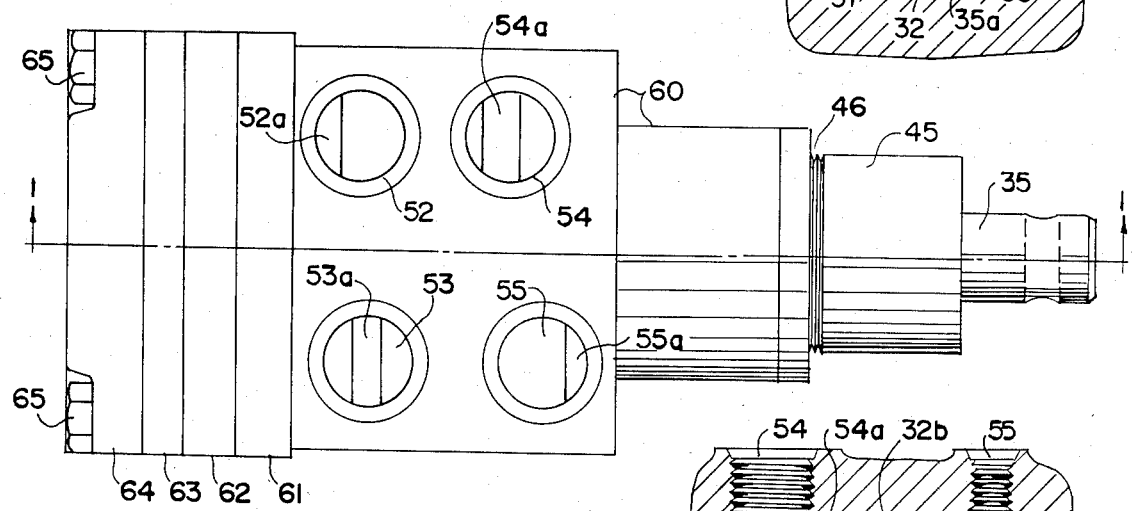
FIG. 2 is a top plan view of the device shown in FIG. 1.
Figure 10:
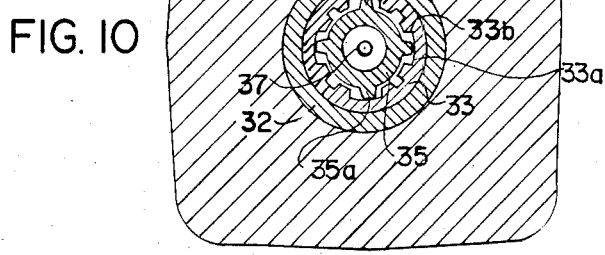
FIG. 10 is a sectional view like FIG. 5 but showing an alternative form where notch 32b does not extend circumferentially like C1.

On the top of the housing 60 are four port openings 52, 53, 54 and 55 as seen in FIG. 2. As seen in FIG. 3, port 53, also designated as R, opens as shown at 53a into the recess R1. This is shown in dot-dash lines schematically in FIG. 3. Also, the port 52, as shown in dotted lines at 52a in FIG. 3, opens to the recess P1. The port 55 as shown schematically in dot-dash lines at 55a opens into recess C2. In like manner, the port 54, as shown in dotted lines at 54a, opens into the recess C1. The recess M1 opens radially outwardly and communicates through passageway 56 with passageway 57 in the wear plate 61. The central hollow opening at the left hand end of the sleeve valve 32 and the slide member 33 as seen in FIGS. 3 and 4, communicates with a central opening 58 in the wear plate 61 and is labeled also M2 in the drawings.

The recesses R1 and R2 are connected through the housing 60 by a passageway 59a shown in schematically in FIG. 3.

The gerotor gear set and servicing passages of this invention are shown in FIGS. 5, 6, 7 and 8. FIG. 3 is a central sectional view through the embodiment with the bearings and seals omitted for simplification of the drawings.

The wear plate 61 has a circular opening 61a which permits the necessary movement of the wobble stick 40 and at the same time forms part of the intake passageway M2 for fluid.

Figure 6:
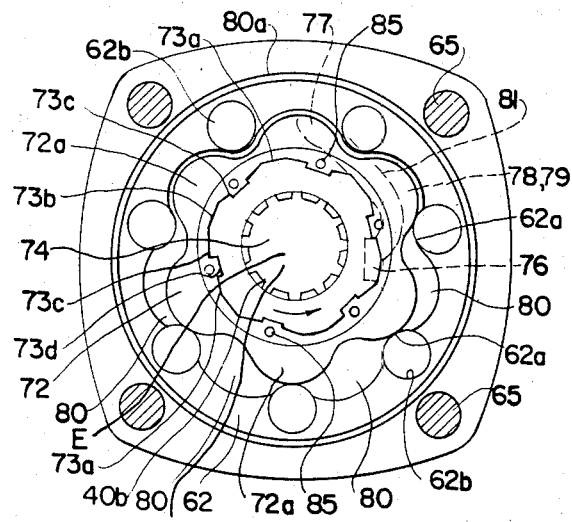

The gerotor 62 is best seen in FIG. 6. It comprises a stator 62 which has a plurality of internally extending teeth 62a, each including at its apex a cylindrical pin 62b. The rotor 72 is shown having a plurality of externally extending teeth 72a which are shaped to fittingly coact with the internally extending teeth 62a and these external teeth being one less in number than the internal teeth previously described. The rotor has an axis E which is eccentric relative to the axis F of the stator and the line G passing through points E and F is herein designated as the line of eccentricity. The rotor is provided with a generally annular ring 73 forming part of the intake passageway for fluid. This passageway is concentric around the axis E. Inside the annular ring 73 is a circular opening 74, also concentric, for the exhaust of fluid M1 from the rotary fluid pressure device. Six openings 85 are for inward flow of hydraulic fluid.

Figure 7:
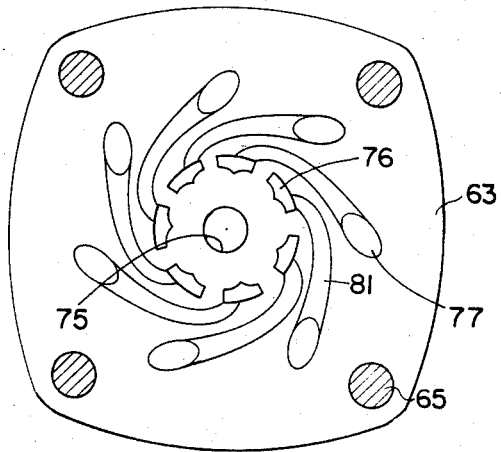
Figure 8:
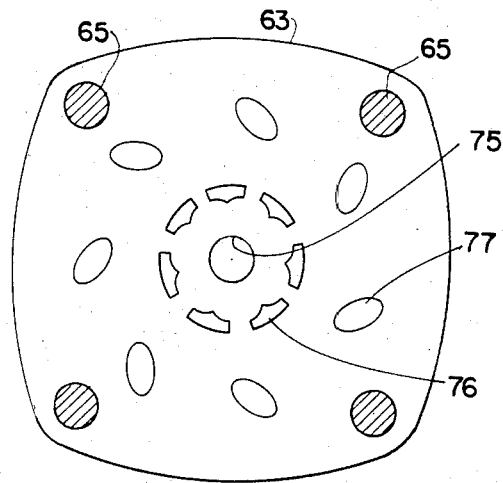

Referring now to FIGS. 6, 7 and 8, FIG. 8 shows the face of the manifold toward the gerotor structure 62, 72. Centrally there is the exhaust opening 75 which communicates with the exhaust opening. In the next circle and concentric, are seven rotor communicating openings 76. These openings selectively communicate with M1 or M2 as the device is operated. In an outer concentric circle there are seven passageways openings 77 so positioned that they cooperate circumferentially with the cells 80 which are formed in changing fashion between the rotor and the stator as seen in FIG. 6.

FIG. 7 shows the face of the manifold 63 toward the end cap 64. This shows the through passageways 76 each connected to one of the openings 77 by means of passageways 78.

The cooperation of these parts is shown in dot-dash lines in FIG. 6 at 81. This shows one of the openings 77 in position to cooperate with a cell 80a at the top of FIG. 6 and it is in cooperation through passageway 78, here shown diagrammatically with one of the openings 76, which you might say is about two and one-half positions away going around the circle. It will now be seen how the radially outward openings 73a in the annular ring 73 cooperate with the communicating passageways 76. There are six of the formations 73a and each comprises a central, radially outermost portion 73b which extends substantially circumferentially and at each end of this outermost portion is a radially and circumferentially inwardly sloping portion 73d. Each of the passageways 76 is herein described as double trapezoidal in section. It will now be seen in FIG. 6 that when the dead pocket 80a at the top of FIG. 6 is in communication with its associated opening 77, then the other end of the connection through the 78 connection and shown at 76 in dot-dash lines will illustrate how the exhaust pocket related to cell 80a is shut off before the fluid is transferred from the associated intake pocket 76. It will now be seen that the shape of each of the portions 73a of the annular ring 73 match fairly well with the radially outer edges of the double trapezoidal passageways 76.

It should now be apparent how this gerotor device of FIGS. 6-8 operates. This device is described in the environment of the hydrostatic steering device of FIG. 4. (Due to the axial position of the sleeve valve 32 a left hand turn is indicated.) High pressure fluid travels from groove P1 to pressurize M2 and the circular opening 74 of the rotor 72. Because of the position of the rotor 72 this circular opening 74 communicates with the rotor communicating openings 76 leading to some of the cells 80 of the gerotor device. Due to the eccentric positioning of the rotor 72 certain other cells 80 communicate with the annular ring 73. The high pressure fluid causes the cells 80 subject to it to expand—the rotor 72 begins to rotate in the direction of the arrow in FIG. 6. This rotation forces other cells 80 to contract. Since these other cells 80 communicate with the annular ring 73, the output fluid travels through annular rings 73 through passageway 57 to M1, and from M1 to C1.

Figure 9:
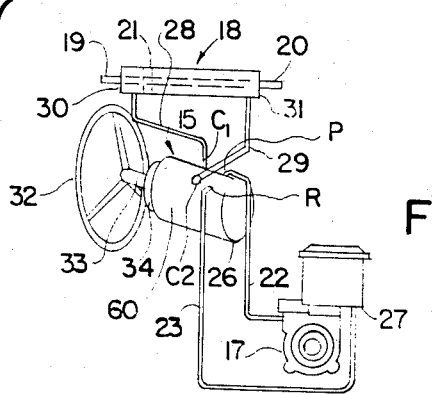
FIG. 9 is a schematic view of a power steering system for the dirigible vehicle which includes a hydrostatic steering device constructed according to the present invention.

In FIG. 9 there is shown a schematic drawing illustrating how the hydrostatic steering device of this invention may be connected up to a dirigible vehicle. The pressure fluid device shown in FIG. 9 is the hydrostatic steering device 15 herein described in connection with FIGS. 1 through 4 and indicated in FIG. 9 with the reference 15. A power driven pump is shown at 17 with its associated reservoir of hydraulic fluid 27. A double acting cylinder 18 is shown for steering the vehicle, having a piston 21 and piston rods 19 and 20 at opposite ends of the cylinder which are intended to be connected to the right and left hand steering mechanisms of the vehicle. In operation, the power driven pump 17 has its high pressure connection at 24 communicating by line 22 to the port P which is the port 52 in the housing 60. The return port R, which is port 53 in housing 60, is connected by line 23 back to the low pressure discharge 27 coming back to The pump reservoir. The port C1 or 54 in the housing 60, is connected by line 28 to the end 30 of the cylinder 18. The port C2, or 55 in housing 60, is connected by line 29 to the end 31 of the cylinder 18. The steering wheel 32 has a shaft 33 which is connected to the drive shaft 35 of the hydrostatic steering device so that to provide a right hand turn, the parts of the hydrostatic steering device are moved to the position shown in FIG. 3, or to make a left turn, they are moved to position of the part shown in FIG. 4.

The description of this invention has included a specific gerotor set at 62, 72, but it should be understood that any suitable gerotor set might be used in this invention which creates a series of chamber increasing in size on one side of the line of eccentricity and other series of chambers decreasing in size on the opposite side of the line of eccentricity as described in connection with FIG. 6.

In the position of the parts in neutral position as shown in FIG. 1, it will be noted that the recesses P1 and P2 are in communication with the recess R1 so that no action of the hydrostatic steering device will take place.

In the position of the parts to make a right turn, as seen in FIG. 3, the drive shaft 35 has been oscillated to cause the balls 41 to move the sleeve valve 32 and the slide member 33 to the position shown in FIG. 3. In this position, the recess P2 is in communication with the recess M1 which communicates through the annular ring 73 and certain manifold passages 76, 78 and 77 to certain cells 80 of the gerotor device as seen in FIGS. 7 and 8 while the circular opening 74 as seen in FIGS. 7 and 8, communicates through other manifold passages 77, 78 and 76 from other cells 80 to M2 which is in communication with recess C1 through piston 18, and which is in communication with recess R2 and thus returns to the pump reservoir. As the vehicle then turns towards the right, the gerotor set returns to neutral position and the drive shaft 35 returns to the neutral position of FIG. 1.

For a left hand turn, the steering wheel is turned in that direction which causes oscillation of the drive shaft 35 in the opposite direction so that which occurred in connection with FIG. 3 causing the balls 41 to drive the members 32 and 33 toward the right as viewed in FIG. 4. In this position of the parts, the recess P1 opens into M2 which communicates through the circular opening 74 and certain manifold passages 76, 78 and 77 to certain cells 80 (FIGS. 7 and 8) and at the same time, one of the other cells 80 communicates through other manifold passages 77, 78 and 76 and annular ring M1 to recess C1 and through piston 18 to recess C2 and so into recess R2 as seen in FIG. 4 which returns the hydraulic fluid back to the pump reservoir. Then, as the car makes the indicated turn, the gerotor set moves back toward neutral position and the parts of the hydraulic hydrostatic steering device return to the position of FIG. 1.

Figure 11:
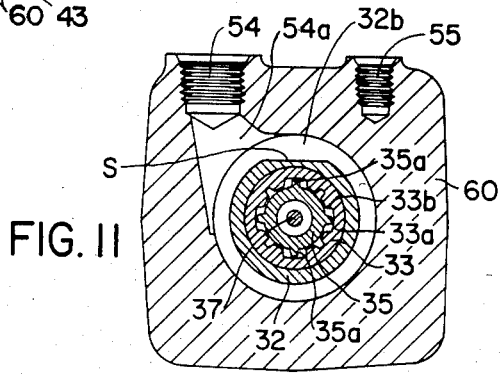
FIG. 11 is a sectional view (like FIG. 5) of the disclosed form of the invention wherein the spool valve 32 has a series of staging grooves S cut into its outside surface, these staging grooves S extending less than 360° around the circumference of the spool valve 32.

The staging grooves S in the spool valve 32 extend less than 360° around the circumference of the spool valve 32. This structure is shown in FIG. 11.

Figure 27:
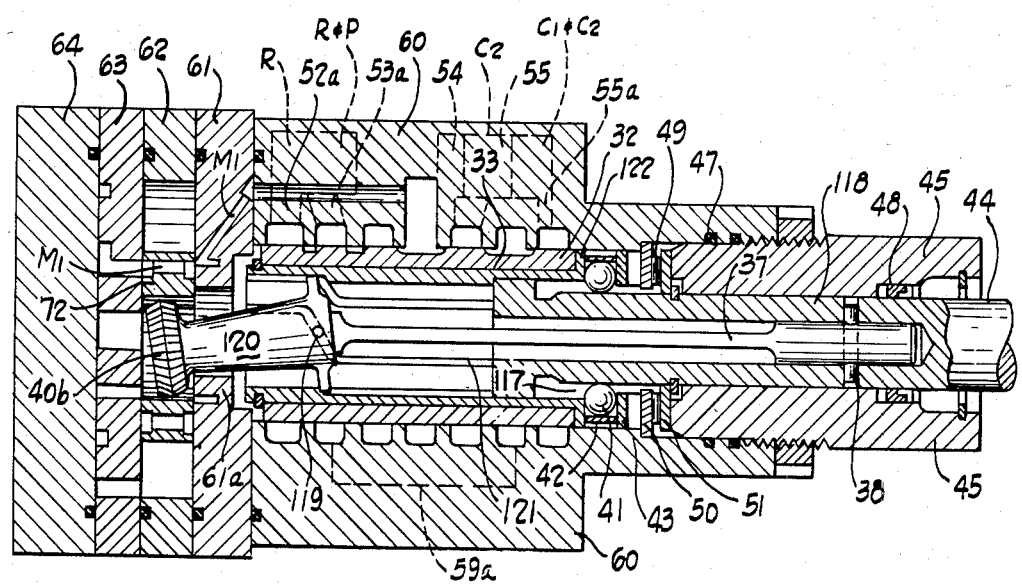
FIG. 27 is a central sectional view of the hydrostatic steering device of FIG. 1 with wobble stick valve actuation.

FIG. 27 is a central sectional view of the hydrostatic steering device of FIG. 1 with wobble stick valve actuation. In this alternate device the balls 41 engage straight grooves 117 in the drive shaft 118 while the pins 119 in the wobble stick 120 engage grooves 121 in the slide member 122. The grooves 121 have a diagonal slant about the neutral position of the pins 119. The grooves 121 are straight on either side of this diagonal section. The balls 41 straight grooves 117 connection causes the slide member 122 to rotate with the drive shaft 118. The pins 119 grooves 121 connection translates this rotary motion into axial movement of the slide member 122 within the confines of the diagonal section of the grooves 121. Thereafter the pins 119-grooves 121 connection causes the wobble stick 120 to rotate with the slide member 122. The slant and length of the diagonal section of the grooves 121 is chosen to provide the desired steering action.

The wobble stick valve actuation device is operatively identical to the device of FIG. 1.

Figure 12:
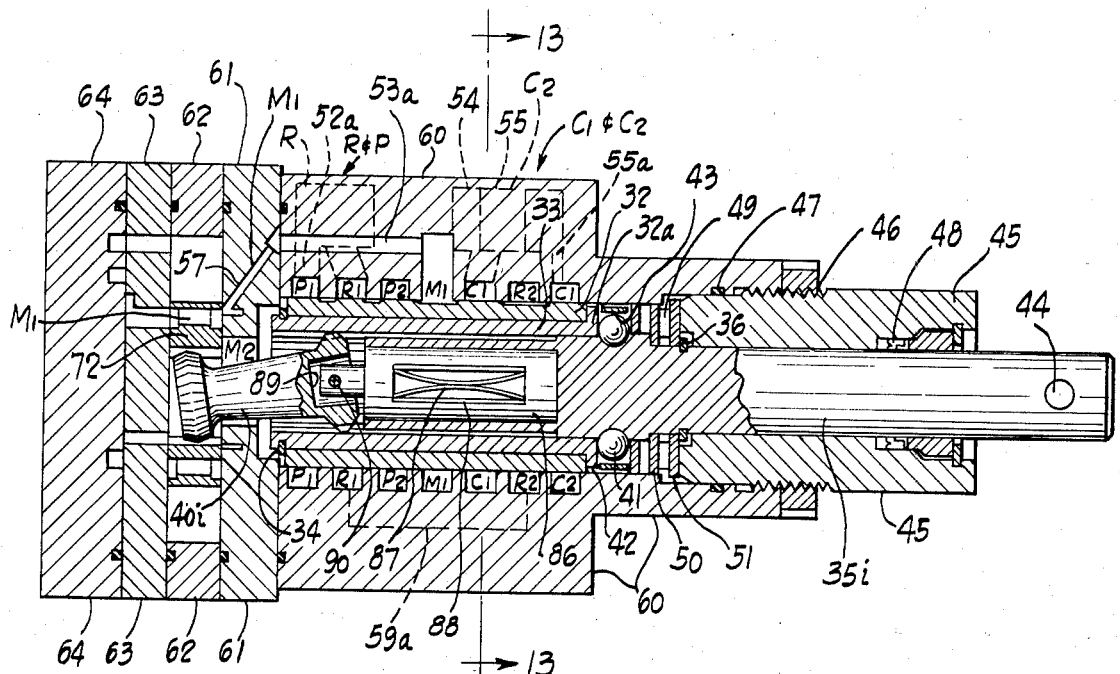
FIG. 12 is a central sectional view like FIG. 1 of an alternate hydrostatic steering device. This alternate embodiment has a compression spring torsion member instead of a torsion bar.
Figure 13:
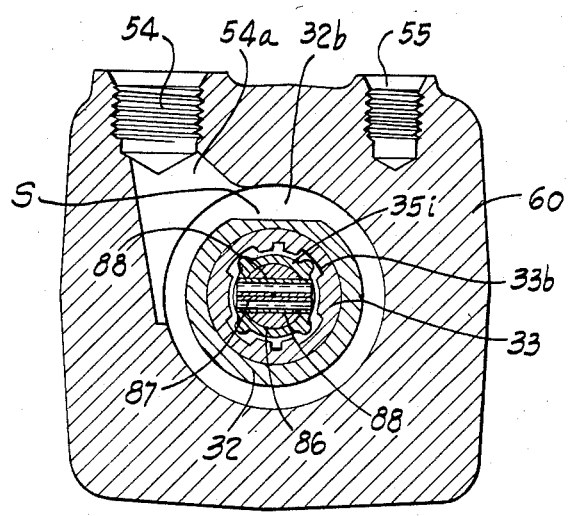
FIG. 13 is a sectional view of the alternate hydrostatic steering device of FIG. 12 taken generally along lines 13—13 of that figure.

FIGS. 12 and 13 disclose the invention of this application incorporated into an alternate hydrostatic steering device. This alternate embodiment uses a torsion cylinder 86 and compression springs 87 to replace the torsion bar 37 of the hydrostatic steering device of FIGS. 1 through 11.

In this alternate embodiment a torsion cylinder 86 is journaled into the wobble stick 40*i* end of the drive shaft 35*i*. The torsion cylinder 86 and the drive shaft 35*i* are both slotted. Two compression springs 87 are within the slots in the torsion cylinder 86 and the drive shaft 35*i*. Two flat plates 88 about the compression springs 87 insure the unfettered operation of this alternate torsion connection. An end of the torsion cylinder 86 extends beyond the drive shaft 35*i*. This end of the torsion cylinder 86 extends into a central opening 89 in the wobble stick 40*i*. A pin 90 drivedly connects the end of the torsion cylinder 86 to the wobble stick 40*i*.

The compression springs 87 serve as the torsion connection between the drive shaft 35*i* and the wobble stick 40*i* (through the torsion cylinder 86). These members may be twisted a certain amount relative to each other against the compression springs 87.

With this slight alteration the alternate embodiment of FIGS. 12 and 13 functions as does the torsion bar 37 hydrostatic steering device of FIGS. 1 through 11; the other parts of the hydrostatic steering device are identical.

Figure 14:
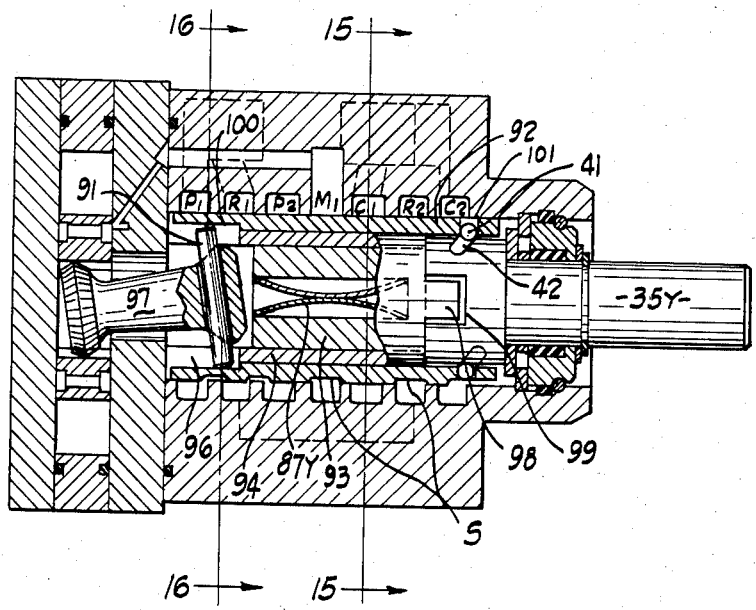
FIG. 14 is a central sectional view like FIG. 1 of an alternate hydrostatic steering device. This alternate embodiment has a heavy pin wobble stick drive link and a combined spool valve-slide member.
Figure 16:
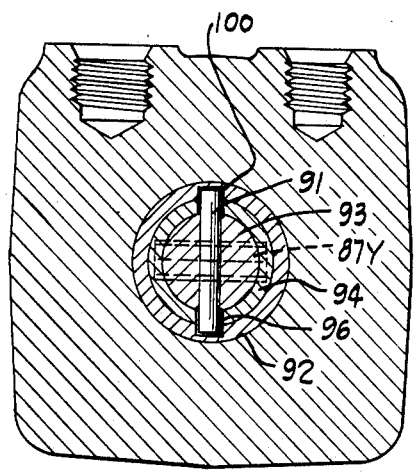
FIG. 16 is a sectional view of the alternate hydrostatic steering device of FIG. 14 taken generally along lines 16—16 of that figure.
Figure 15:
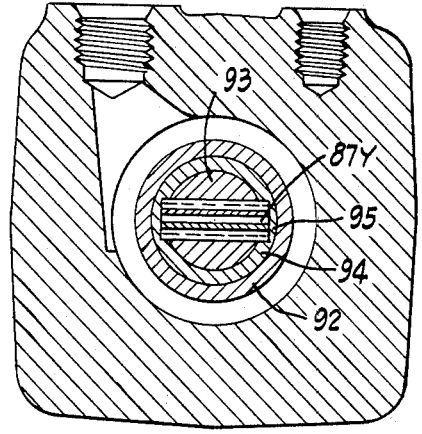
FIG. 15 is a sectional view of the alternate hydrostatic steering device of FIG. 14 taken generally along lines 15—15 of that figure.

FIGS. 14, 15 and 16 disclose an alternate hydrostatic steering device. This alternate device uses a heavy pin drive link 91 as the mechanical drive between the drive shaft and wobble stick. This alternate device also combines the slide member 33 and spool valve 32 of the first device into a unitary valving slide member 92.

In this alternate device the drive shaft 35*y* has an inner end 93 of reduced diameter directly surrounding the compression springs 87*y*. A generally cylindrical drive member 94 is journaled upon the inner end 93 of the drive shaft 35*y*. The compression springs 87*y* fit into two slots 95 that are milled into the inner diameter of the drive member 94. These springs serve as the torsion connection in the device.

One end of the drive member 94 extends beyond the drive shaft 35*y*. Two slots 96 are formed in this end of the drive member 94. A heavy pin or tooth (⅜ diameter) drive link 91 extends through the wobble stick 97 and these slots 96 forming a drive connection between them. At the other end of the drive member 94 two tangs 98 extend into two slots 99 in the drive shaft 35*y* forming a drive connection between them. (See FIG. 14A) Slots 99 are oversized such that there is a lost-motion type connection between the drive shaft 35*y* and the drive member 94. At the end of the rotary motion allowed by this lost-motion type connection (15° either direction), the drive member 94 is a solid mechanical drive between the drive shaft 35*y* and the wobble stick 97. The slots ease assembly and repair of the device.

With modifications obvious to one skilled in the art, the relative positions of the drive shaft 35*y* and drive member 94 could be reversed with the drive member 94 journaled inside the drive shaft 35*y*.

A valving slide member 92 surrounds the drive member 94 and part of the drive shaft 35*y*. Slots 100 formed in one end of the valving slide member 92 accept the outer ends of the heavy pin drive link 91. At the other end of the valving slide member 92 a plurality of balls 41, carried in recesses 101 of the valving slide member 92, engage short helical grooves 42 in the drive shaft 35*y*. Together these transform oscillation of the drive shaft 35*y* into axial movement of the valving slide member 92.

Staging grooves S on the outer circumferential surface of the valving slide member 91 valve the device. These grooves are located at the neutral position of the device generally opposite to the fluid ports openings. Any rotary motion of the valving slide member would move the staging grooves S in respect to their initial position to vary the point of least resistance, and the direction of fluid flow, of the device. This would help lubricate and cool the device in a manner similar to the rotating spool valve of FIGS. 1-13.

The hydraulic device otherwise operates in the same manner as the first and second embodiment.

Figure 26:
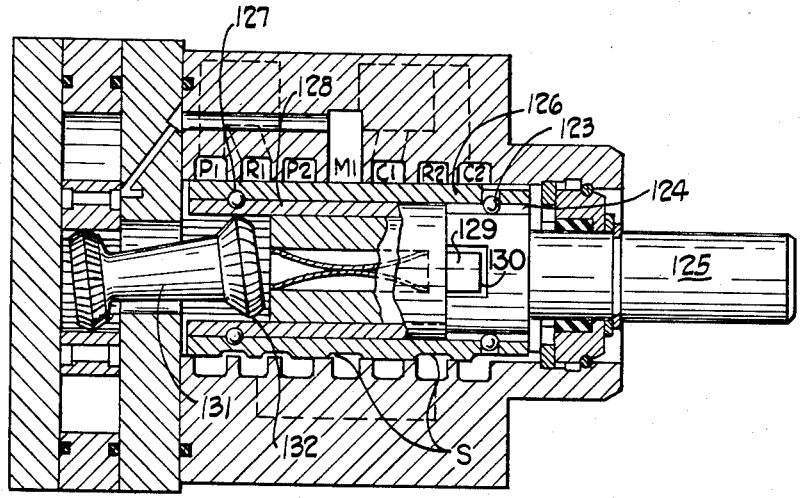
FIG. 26 is a central sectional view of the hydrostatic steering device of FIG. 14 with inverse valve actuation and without a heavy pin wobble stick.

FIG. 26 is a central sectional view of the hydrostatic steering device of FIG. 14 with inverse valve actuation and without a heavy pin wobble stick. In this device balls 123 in straight grooves 124 in the drive shaft 125 cause the valving slide member 126 to rotate with the drive shaft. At the other end of the valving slide member 126 balls 127 captured in diagonal grooves (not shown) in one of the valving slide member 126 and drive member 128 cause the sliding valve member 126 to move axially on either side of a neutral position (within the confines allowed by the lost motion drive connection between tang 129 of the drive member 128 and slot 130 of the drive shaft 125).

The inverse valve actuation device functions similarly to the straight valve actuation device.

The wobble stick 131 of this particular embodiment has a tooth connection with the drive member 128.

Figure 17:
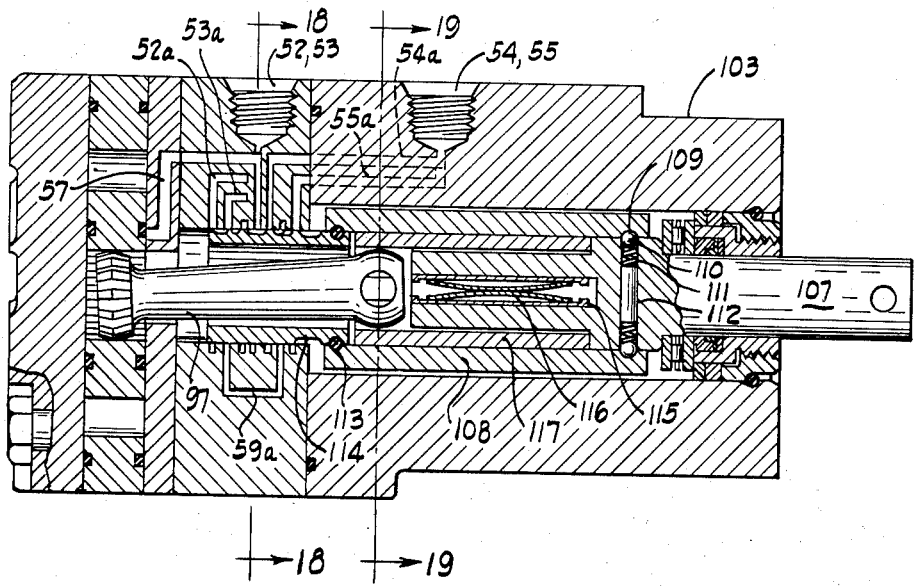
FIG. 17 is a sectional view like FIG. 1 of a second alternate hydrostatic steering device.
Figures 18, 19:
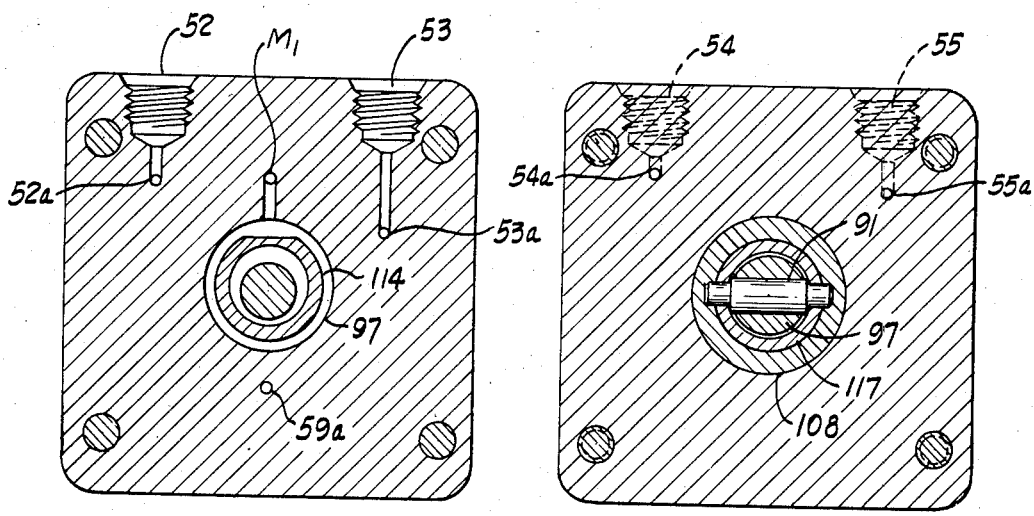
FIG. 18 is a sectional view of the device of FIG. 17 taken generally along lines 18—18 of that figure.
FIG. 19 is a sectional view of the device of FIG. 17 taken generally along lines 19—19 of that figure.

FIGS. 17, 18 and 19 disclose a second alternate hydrostatic steering device. This alternate device utilizes an inverse drive shaft-torsion member connection.

The device of FIG. 17 includes an interior pressure helical connection between the drive shaft 107 and the valving slide member 108 and two piece reduced diameter valving slide member 108, 114.

In the interior pressure helical connection the helical grooves 109 are formed on the inside diameter of the valving slide member 108 (instead of on the outside diameter of the drive shaft 35—See 42 in FIG. 14). The cooperating balls 110 are mounted in the drive shaft 107 (instead of in recesses in the valving slide member 92—see 101 of FIG. 14). There is a spring force 111 between the balls 110 forcing them into contact with the helical grooves 109. A pin 112 between the balls 110 insures that at least one ball 110 remains in contact with the helical grooves 109 in the event of a spring 111 failure.

There is a direct connection 113 between the two pieces 108, 114 of the valving slide member. This connection 113 retains the two pieces of the valving slide member 108, 114 in axial position in respect to each other. The piece 114 which accomplishes the valving can be allowed to rotate (indeed it is preferred that the piece 114 be designed to rotate; by thus varying the path of least resistance the device would be cooled and lubricated).

Two plates 115 surrounding two torsion leaf springs 116 form the lost-motion type interconnection between the drive shaft 107 and the drive member 117. These plates provide a solid drive connection between the drive shaft and the drive member 117 after a certain limited degree of rotation (like the tang 98-slot 99 connection in FIG. 14).

This device operates similarly to the previous embodiments (FIGS. 14–16).

FIGS. 20–25 disclose a third hydrostatic steering device incorporating the invention of this application. This hydrostatic steering device utilizes an "H" drive member as the drive connection between the wobble stick and the other parts of the device.

The valve actuation parts of the device include a wobble stick 132, the aforementioned "H" drive member 133, an actuation member 134, a sliding valve sleeve 135, a torsion member 136, an interconnection member 137 and a drive shaft 138.

The wobble stick 132 has a direct toothed connection with one end of the "H" drive member 133 for rotation therewith.

The other end of the "H" drive member 133 forms a lost-motion type drive connection with the drive shaft 138. See FIG. 22. The small space 151 between the drive shaft 138 and the "H" drive member 133 creates the lost-motion type connection by allowing limited rotary motion between the drive shaft 138 and the "H" drive member 133.

The sliding valve sleeve 135 surrounds the "H" drive member 133 and part of the drive shaft 138 with a slight clearance, preferably between about 0.002 and 0.020 inches therebetween (to allow for fluid passage).

An actuation member 134 extends between the "H" drive member 133 and the sliding sleeve valve 135 for translating any rotary motion of the sliding sleeve valve 135 into axial motion of the same piece 135. (Within limits to be later described).

The actuation member 134 includes two balls 139, a spring 140, a safety rod 141 and bushings 142. See FIG. 21. The balls 139 of the actuation member 134 engage diagonal grooves 143, in the sliding sleeve valve 135. The spring 140 tensions the balls 139 in these grooves 143. The safety rod 141 prevents the disengagement of the balls 139 from the grooves 143. The bushings 142 prevent any binding of the balls 139.

An interconnection member 137 extends between the drive shaft 138 and the sliding sleeve valve 135. Due to this connection any rotary motion of the drive shaft 138 rotates the sliding sleeve valve 135.

The interconnection member 137 includes two balls 144, a spring 145, a safety rod 146 and two bushings 147. See FIG. 22. The balls 144 engage straight grooves 148 in the sliding sleeve valve 135. The spring 145 tensions the balls 144 in these grooves 148. The safety rod 146 prevents the disengagement of the balls 144 from the grooves 148. The bushings 147 prevent any binding of the balls 144.

Figure 30:
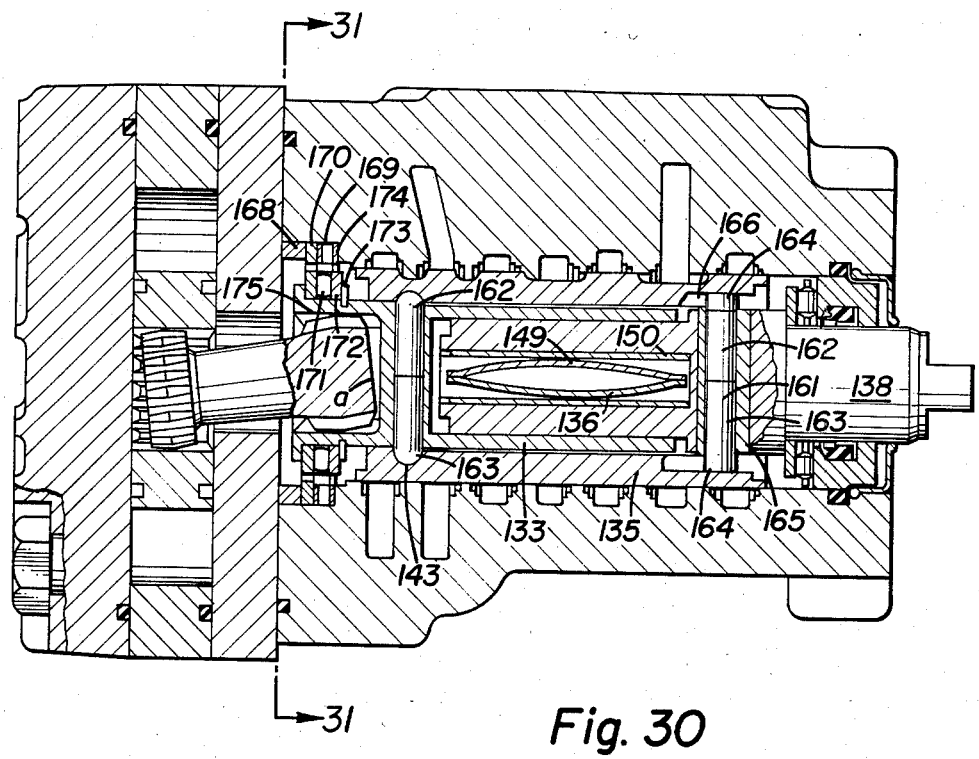
FIG. 30 is a central sectional view of the third hydrostatic steering device of FIG. 20 showing adjustment shims and split-pin actuators. (One set in an eccentric bushing.)
Figure 31:
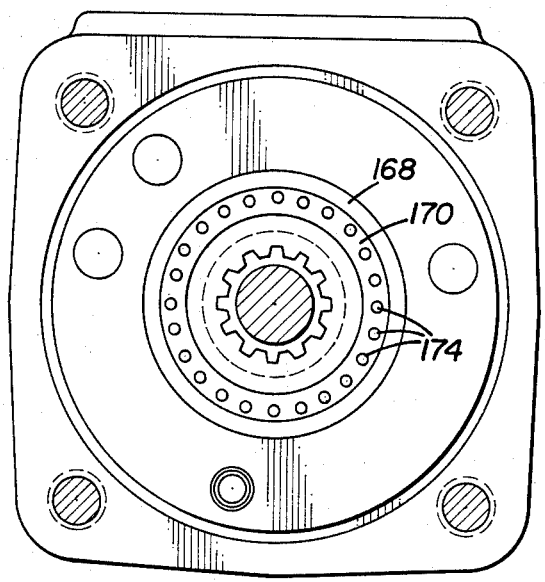
FIG. 31 is a sectional view of the device of FIG. 30 taken generally along lines 31—31 of that figure.
Figure 32:
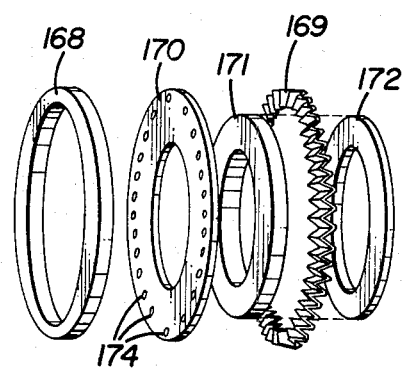
FIG. 32 is an expanded open view of the ajdustment shim, flow through washer, and wave spring of FIG. 30.
Figure 34:
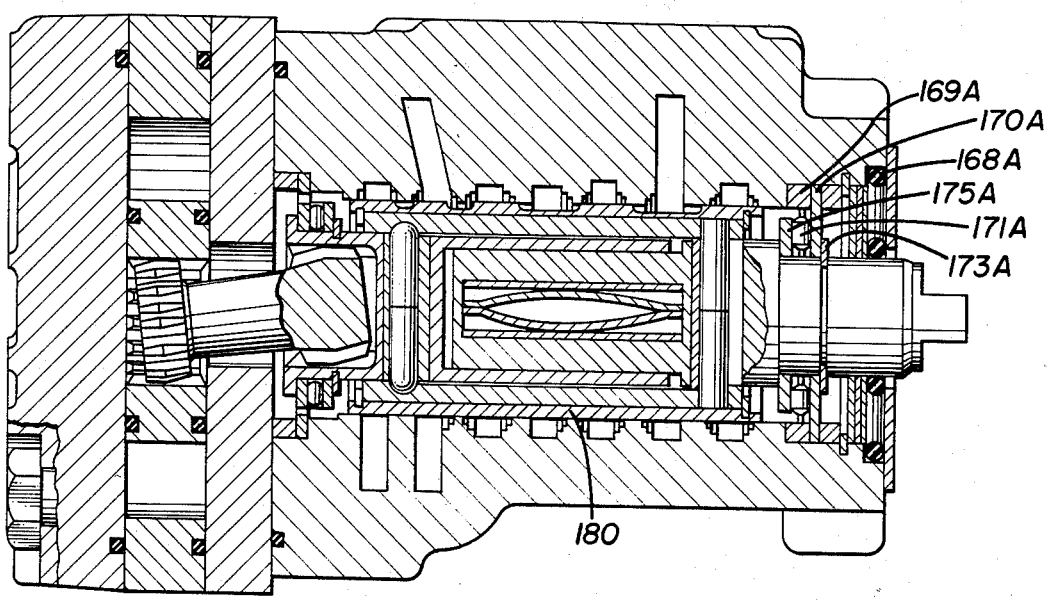
FIG. 34 is a central sectional view of the hydrostatic steering device of FIG. 30 showing inverse actuation.

Alternately the actuation member 134 and interconnection member 137 can each be split-pins 161 as shown in FIG. 30 and FIG. 34. Each section 162,163 of the split-pins 161 is free to rotate independently of the other section 162,163. The central bearing surface "a" between the sections 162,163 of the split-pins 161 is lubricated by the incidental fluid in the device. There will be no binding. The solid nature of the split-pins insures positive actuation at all times. Due to the split it is possible for the pins 161 to have square ends 164. These square ends 164 increase the durability of the device as well as allowing more precise operation.

Figure 33:
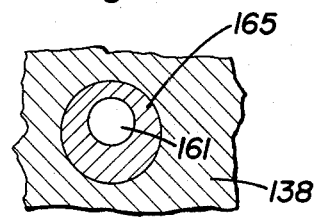
FIG. 33 is an expanded top view of the eccentric bushing of FIG. 30.

In any across the drive shaft 138 actuation embodiment (the balls of FIG. 20, the split pins of FIG. 30 or otherwise), it is difficult to precisely align the actuation members; the machining of the device cannot easily be held to the needed accuracy. For this reason some tolerances are always built in, tolerances which effect the operation of the device. One way to more precisely align the actuation members is to use a self-aligning eccentric bushing 165 between the members, for example the actuator 161 and the drive shaft 138. See FIGS. 30 and 33. The eccentricity of the bushing 165 allows movement of the actuator 161 in a plane perpendicular to the axis of the drive shaft 138 during the assembly of the device. Since any misalignment of the actuator 161 and the groove 166 will normally occur in this plane the eccentricity of the bushing 165 will compensate for misalignment. Once assembled the bushing 165 will not normally move in respect to the device. (The sum of the forces on the opposite ends of the actuator 161 will normally equal zero.) The bushing 165 therefor improves the precision of operation of the device as well as simplifying the construction thereof.

A torsion member 136 extends between the drive shaft 138 and "H" drive member 133. This torsion member 136 serves as the torsion connection of the device.

The torsion member 136 includes two axially extending compression leaf springs 149 trapped between two flat plates 150. (The springs 149 are shown compressed in FIG. 23.) Leaf springs 149 are cut-out (see FIG. 20A) to reduce the initial torsion of the torsion member.

A lost-motion type interconnection exists between the drive shaft 138 and the "H" drive member 133. This lost-motion type interconnection limits the degree of rotary motion allowed by the device between the drive shaft 138 (and interconnected sleeve valve 135) and the "H" drive member 133.

Figure 23:
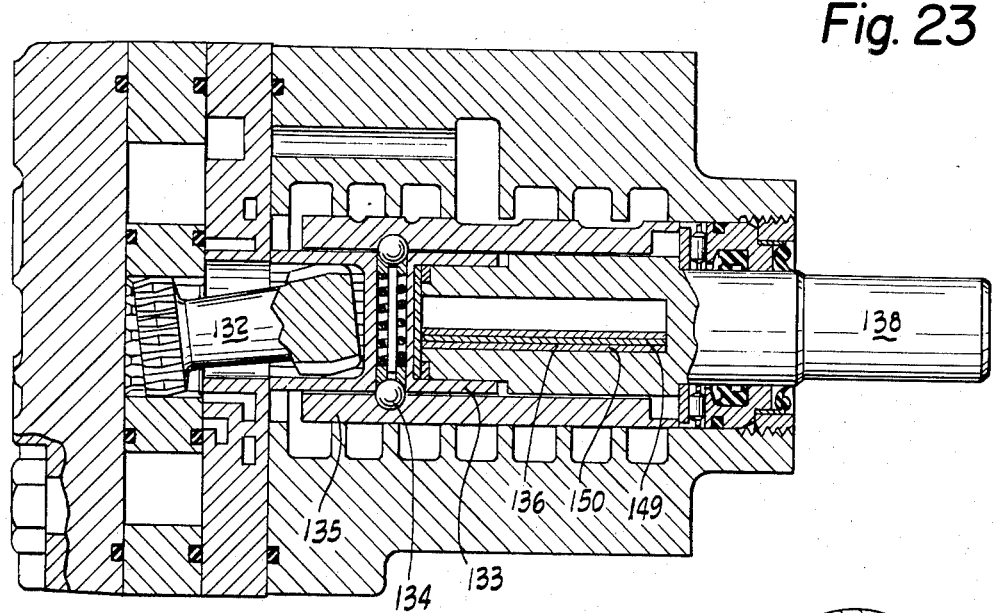
FIG. 23 is a central sectional view of the device of FIG. 20 with compressed springs.
Figure 25:
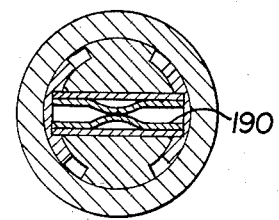
FIG. 25 is a sectional view of the device of FIG. 24 taken generally along lines 25—25 of that figure.

FIG. 23 shows the third hydrostatic steering device of FIG. 20 in a full turning position.

Figure 24:
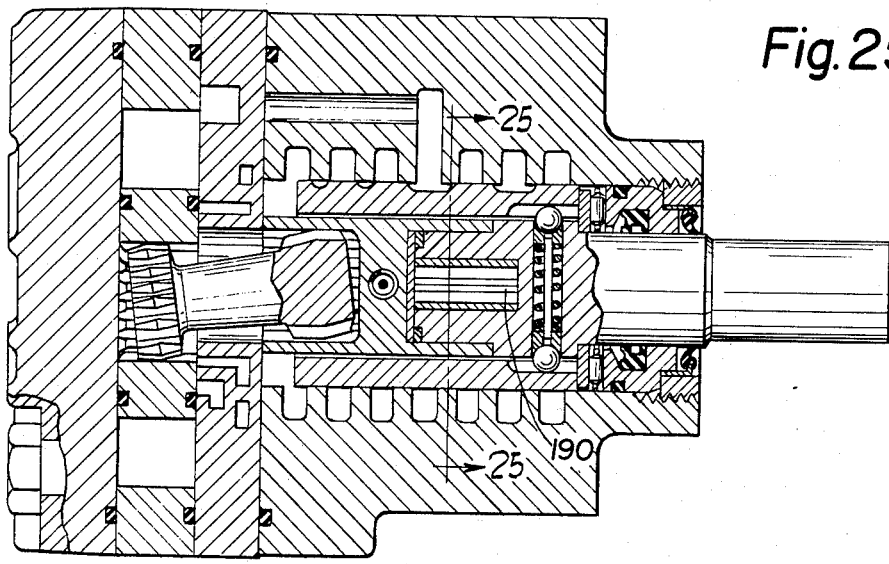
FIG. 24 is a central sectional view like FIG. 20 with alternate lateral springs.

FIG. 24 shows a modified third hydrostatic steering device. In this figure the compression leaf springs 190 extend laterally of the device. See FIG. 25. This modification allows the hydrostatic steering device to be of more compact construction.

In certain circumstances it is desirable that a certain rotational position of the shaft 138 correspond exactly to a neutral position of the sliding valve sleeve 135. To accomplish this the axial position of the "H" drive member 133 is adjusted by the selective choice of a shim 168. See FIGS. 30–34.

To accomplish this adjustment the part of the steering device to the right of line 31—31 is completely assembled including the wave spring 169, the flow washer 170, the thrust bearing 171, the thrust bearing washer 172, the snap ring 173 and the "H" drive member 133, but without the shim 168. The wave spring 169 bears on a shoulder 174 of the main body of the device. The flow washer 170 is held in place against a shoulder 175 of the "H" drive member by the thrust bearing 171, the thrust bearing washer 172 and the snap ring 173. The shaft 138 is then rotationally fixed at the desired neutral position. At this time the "H" drive member 133 is pressed against the flow washer 170. As the "H" drive member 133 is moved the sliding valve sleeve 135 will also move, eventually to a neutral position. The distance of the flow washer 170 from the surface at line 31—31 is then noted and a shim 168 having a depth equalling this distance is selected. The selected shim 168 is placed in position next to the flow washer 170. Due to the resilient nature of the wave spring 169 shims of differing depths can be used without problems. The part of the steering device to the left of the line 31—31 is then joined with the part of the steering device to the right of the line 31—31. The joinder of the two parts captures the shims 168 therebetween and locates the sliding valve sleeve 135 into the desired neutral position. Small holes 174 in the flow washer 170 and the distance between the wave spring 169 and the thrust bearing complex 171-173 allow fluid to flow unimpeded. The flow washer thrust bearing complex 169-173 prevents axial movement of the "H" drive member 133 from the desired setting once the setting has been made. In operation the "H" shaped drive member 133 rotates about this complex 169-173.

FIG. 34 shows the use of adjustment shims in a similar mechanism 168A-173A at the forward input shaft end of a hydrostatic steering device. The device of FIG. 34 also incorporates a separate sleeve valve 180 such as shown in FIG. 1 of this application into an adjustable neutral position device such as shown in FIG. 30.

Likewise in all other embodiments a similar adjustment of the distance between the rotational to rotational interconnection and the rotational to axial interconnection will vary the neutral position of the device.

Figure 28:
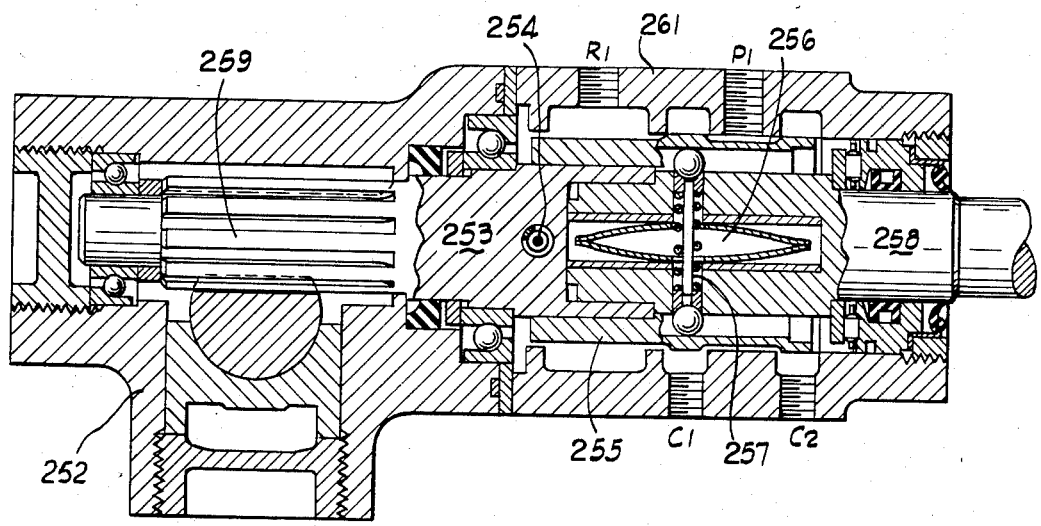
FIG. 28 is a central sectional view of the valving actuation mechanism of FIG. 1 in a rack and pinion power steering device.
Figure 29:
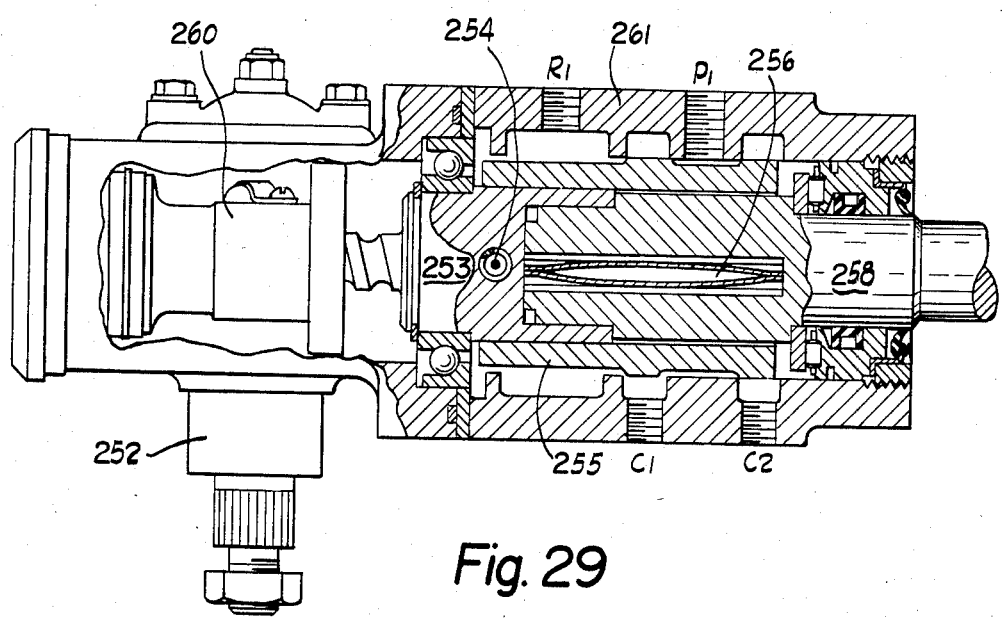
FIG. 29 is a central sectional view of the valving actuation mechanism of FIG. 1 in a recirculating ball power steering device.

FIGS. 28 and 29 incorporate the actuating valve of this invention into rack-and-pinion and worm power steering units, respectively.

The valve actuation parts of these units include a manual steering mechanism 252, a "C" drive member 253, an actuation member 254, a sliding valve sleeve 255, a torsion member 256, an interconnection member 257 and a drive shaft 258.

The manual steering mechanism 252 has a direct manual drive connection with the "C" drive member 253 for rotation therewith. In the rack-and-pinion steering unit (FIG. 28) the pinion 259 is an extension of the "C" member 253. In the ball power steering unit (FIG. 29) the worm 260 is an extension of the "C" member 253.

The "C" drive member 253 forms a lost motion type drive connection with the drive shaft 258 (see "H" drive member connection in FIG. 22).

The sliding valve sleeve 255 surrounds the "C" drive member 253 and part of the drive shaft 258. The fit between the sliding valve sleeve 255 and the body 261 of the steering units is tight to limit fluid travel past the valve seats. The fit between the sliding valve sleeve 255 and the "C" drive member 253-drive shaft 258 is not so tight; fluid must travel through the spaces of this connection.

The actuation member 254 extends between the "C" drive member 253 and the sliding valve sleeve 255 for translating any rotary motion of the sliding sleeve valve 255 into axial motion of the same piece 255 (for the rotary motion allowed by the lost motion interconnection of the "C" drive member 253 and the drive shaft 258).

An interconnection member 257 extends between the drive shaft 258 and the sliding sleeve valve 255. Due to this connection, rotary motion of the drive shaft also rotates the sliding sleeve valve 255.

The actuation member 254 and interconnection member 257 are similar in construction to the actuation member 134 and interconnection member 143, respectively, of FIG. 20 previously described.

A torsion member 256 identical to torsion member 136 of FIG. 20 extends between the drive shaft 258 and the "C" drive member 253.

These steering mechanisms function similarly to the other embodiments of my invention. For example:

In a neutral centered position (see FIG. 28) the hydraulic fluid enters port P1 and flows directly out of port R1. The cylinder ports C1 and C2 are interconnected.

When an operator rotates the drive shaft 258 in a turn, the sleeve valve 255 also rotates. In that the "C" drive member 253 remains stationary the actuation member 254-diagonal actuation grooves (not shown) cause the sliding sleeve valve 255 to move axially (see FIG. 29). In this turning position the fluid enters port P1 and flows out of port C1. The returning fluid enters port C2, travels on the inside of the sliding sleeve valve 255 between the valve 255 and the drive shaft 258 and "C" drive member 253, and thence out of port R1.

The direct connection between the "C" drive member 253 and the manual steering mechanism 252 provides for emergency direct non-power steering in the event of a malfunction of the hydraulic steering mechanism.

The direct connection and rack-and-pinion and worm power steering units are preferable for consumer devices.

Although this invention has been described in its preferred form with a certain degree or particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a device having an actuation pin between a cylinder and a surrounding sleeve, the improvement of the actuation pin being solid and split in a plane substantially perpendicular to the longitudinal axis of the pin such that the actuation pin insures actuation and that rotational forces on one end of the pin do not interact with the rotational forces on the other end of the pin.

2. In a device having an actuation pin between a cylinder and a surrounding sleeve, the improvement of the actuation pin being solid and split in a plane substantially perpendicular to the longitudinal axis of the pin such that the actuation pin insures actuation and the rotational forces on one end of the pin do not interact with the forces on the other end of the pin and characterized in that at least one of the opposing ends of the split actuation pin are square, such shape spreading the forces between the pin and the surrounding sleeve over an increased area.

3. In a device having an actuation pin between a cylinder and a surrounding sleeve, the improvement of the actuation pin being solid and split in a plane substantially perpendicular to the longitudinal axis of the pin such that the actuation pin insures actuation and the rotational forces on one end of the pin do not interact with the forces on the other end of the pin and characterized in that the opposing ends of the split actuation pin are square, such shape spreading the forces between the pin and the surrounding sleeve over an increased area.

4. In a hydrostatic steering device having a rotatable drive shaft, an axially operated spool valve, and an actuation means including a slide member, means to directly connect the slide member to the drive shaft for transforming the rotational motion of the drive shaft into axial movement of the slide member, and means to connect the spool valve to the slide member for transmitting axial motion of the slide member into axial motion of the spool valve with the result that rotational motion of the drive shaft is directly transformed into axial motion of the spool valve through the slide member, the improvement of the means to directly connect the slide member to the drive shaft for transforming the rotational motion comprising an actuation pin, said actuation pin being split in a plane substantially perpendicular to the longitudinal axis of the pin, said actuation pin extending through a hole in the drive shaft, one end of said actuation pin engaging a diagonal groove in the slide member, and the other end of said actuation pin engaging a second diagonal groove in the slide member, the ends of said actuation pin being free to rotate about their respective longitudinal axis at differing speeds and in differing directions due to the split in said actuation pin.

5. In a hydrostatic steering device having a rotatable steering means, an axially operated spool valve and an actuation means including a slide member, means to directly connect the slide member to one of the drive shaft or steering means for common rotation therewith, means to directly connect the slide member to the other of the drive shaft or steering means for transforming the rotational motion of the drive shaft into axial movement of the slide member and means to connect the spool valve to the slide member to transmitting axial motion of the slide member into axial motion of the spool valve with the result that rotational motion of the drive shaft is directly transformed into axial motion of the spool valve through the slide member, the improvement of the means to directly connect the slide member to one of the drive shaft or steering means for common rotation therewith comprises an actuation pin, said actuation pin being split in a plane substantially perpendicular to the longitudinal axis of the pin, said actuation pin extending through a hole in one of the drive shaft or steering means, one end of said actuation pin engaging an axially extending groove in the slide member and the other end of said actuation pin engaging a second axially extending groove in the slide member, the ends of said actuation pin being free to rotate about their respective longitudinal axis at differing speeds and in differing directions due to the split in said actuation pin.

6. In a hydrostatic steering device having a rotatable drive shaft, a rotatable steering means, an axially operated spool valve, and an actuation means including a slide member, means to directly connect the slide member to one of the drive shaft or steering means for common rotation therewith, means to directly connect the slide member to the other of the drive shaft or steering means for transforming the rotational motion of the drive shaft into axial movement of the slide member and means to connect the spool valve to said slide member to transmitting axial motion of the slide member into axial motion of the spool valve with the result that rotational motion of the drive shaft is directly transformed into axial motion of the spool valve through the slide member, the improvement of the means to directly connect the slide member to the other of the drive shaft or steering means for transforming the rotational motion of the drive shaft into axial movement of the slide member comprises an actuation pin, said actuation pin being split in a plane substantially perpendicular to the longitudinal axis of the pin, said actuation pin extending through a hole in the other of the drive shaft or steering means, one end of said actuation pin engaging a diagonally extending groove in the slide member and the other end of said actuation pin engaging a second diagonally extending groove in the slide member, the ends of said actuation pin being free to rotate about their respective longitudinal axis at differing speeds and in differing directions due to the split in the actuation pin.

7. In a device utilizing a actuation member mounted in a hole in a cylinder extending across thereof and twin oppositely disposed grooves in a surrounding sleeve for the operable interconnection therebetween, the improvement of an eccentric bushing, and said eccentric bushing in the hole in the cylinder being between said actuation member and the cylinder, such bushing compensating for any misalignment between the hole in the cylinder and the grooves in the surrounding sleeve.

8. In a hydrostatic steering device having a drive shaft, a slide member and a steering means, with a rotational to rotational interconnection between one of the drive shaft and the steering means with the slide member and a rotational to axial interconnection between the other of the drive shaft and the steering means with the slide member, there being a distance between the rotational to rotational interconnection and the rotational to axial interconnection and said slide member having a neutral position, an improved device comprising means to adjust the distance between the rotational to rotational interconnection and the rotational to axial interconnection, this adjustment varying the neutral position of the slide member.

9. In a hydrostatic steering device having a rotatable drive shaft, a rotatable steering means, an axially operated spool valve, and an actuation means including a slide member, means to directly connect the slide member to one of the drive shaft or steering means for common rotation therewith, means to directly connect the slide member to the other of the drive shaft or steering means for transforming the rotational motion of the drive shaft into axial movement of the slide member and means to connect the spool valve to said slide member to transmitting axial motion of the slide member into axial motion of the spool valve with the result that rotational motion of the drive shaft is directly transformed into axial motion of the spool valve through the slide member, the device characterized in the slide member has a neutral position and there is a distance between said means to directly connect the slide member to one of the drive shaft or steering means for common rotation therewith said the slide member to the other of the drive shaft or steering means for transforming the rotational motion of the drive shaft into axial movement of the slide member and characterized by the addition of means to adjust said distance to vary the neutral position of the slide member.

10. In a hydrostatic steering device having a rotatable drive shaft, a rotatable steering means, an axially operated cylindrical spool valve, and an actuation means including a cylindrical slide member, means to directly connect the cylindrical slide member to the drive shaft for common rotation therewith, the cylindrical slide member surrounding a least part of the steering means, helical means on one of the steering means and the cylindrical slide member, cooperating member means on the other of the steering means and the cylindrical slide member, the helical means and said cooperating member means cooperating to directly transform rotational movement of the cylindrical slide member into axial movement of the cylindrical slide member, and means to connect the cylindrical spool valve to the cylindrical slide member for transmitting axial motion of the cylindrical slide member into axial motion of the cylindrical spool valve with the result that rotational movement of the drive shaft is transformed into axial movement of the cylindrical spool valve through the cylindrical slide member, the device characterized in that the slide member has a neutral position and there is a distance between the cylindrical slide member to the drive shaft for common rotation therewith and the cooperating means and characterized by the addition of means to adjust the distance to vary the neutral position of the cylindrical slide member in respect to the steering means.

11. In a method for assembling a hydrostatic steering device having a drive shaft, a slide member with an optimum neutral position and a steering means, there being a rotational to rotational interconnection between one of the drive shaft and the steering means with the slide member and a rotational to axial interconnection between the other of the drive shaft and the steering means with the slide member, there being a distance between the rotational to rotational interconnection and the rotational to axial interconnection, an improvement, said improvement comprising adjusting the distance between the rotational to rotational interconnection and the rotational to axial interconnection during assembly to provide for the optimum neutral position of said slide member.

* * * * *